US011758912B2

United States Patent
Mo et al.

(10) Patent No.: US 11,758,912 B2
(45) Date of Patent: Sep. 19, 2023

(54) PACKAGING EQUIPMENT FOR CONTINUOUS AUTOMATIC NET SLEEVING OF CASING, SHIRRING MACHINE AND PACKAGING METHOD

(71) Applicant: FOSHAN VEHICIAN INTELLIGENT EQUIPMENT CO., LTD., Guangdong (CN)

(72) Inventors: Shaonan Mo, Guangdong (CN); Guangmeng Chen, Guangdong (CN); Yanlin Qin, Guangdong (CN); Shibao Shi, Guangdong (CN)

(73) Assignee: FOSHAN VEHICIAN INTELLIGENT EQUIPMENT CO., LTD., Foshan (CN)

( * ) Notice: Subject to any disclaimer, the term of this patent is extended or adjusted under 35 U.S.C. 154(b) by 779 days.

(21) Appl. No.: 16/891,050

(22) Filed: Jun. 2, 2020

(65) Prior Publication Data

US 2020/0288728 A1 Sep. 17, 2020

Related U.S. Application Data

(63) Continuation of application No. PCT/CN2019/082205, filed on Apr. 11, 2019.

(30) Foreign Application Priority Data

Apr. 3, 2018 (CN) .................... 201810287969.X

(51) Int. Cl.
*A22C 13/02* (2006.01)
*A22C 13/00* (2006.01)

(52) U.S. Cl.
CPC .......... *A22C 13/02* (2013.01); *A22C 13/0003* (2013.01); *A22C 2013/0056* (2013.01); *A22C 2013/026* (2013.01); *A22C 2013/028* (2013.01)

(58) Field of Classification Search
CPC ........ A22C 2013/026; A22C 2013/028; A22C 2013/0056; A22C 13/02; A22C 13/0003
See application file for complete search history.

(56) References Cited

U.S. PATENT DOCUMENTS 4,993,210 A 2/1991 Kollross

FOREIGN PATENT DOCUMENTS

WO 0025593 A1 5/2000

*Primary Examiner* — Daniel Jeremy Leeds

(57) ABSTRACT

The present disclosure relates to packaging equipment for continuous automatic net sleeving of a casing, a shirring machine and a packaging method. The packaging equipment is provided with a shuttle; a first gripper, capable of being opened or closed to release or clamp and fix the shuttle; a second gripper, capable of driving an open end of the net bag to make reciprocating motion between a first position and a second position on the shuttle when being closed, and capable of allowing the net bag to move freely in a net bag conveying direction when being opened; a third gripper, configured to clamp the open end of the net bag and pull the net bag to sleeve a whole shirred casing in a penetrating mode; and a fourth gripper, configured to pull the net bag, and designed to be capable of moving with the third gripper.

12 Claims, 7 Drawing Sheets

PACKAGING EQUIPMENT FOR CONTINUOUS AUTOMATIC NET SLEEVING OF CASING, SHIRRING MACHINE AND PACKAGING METHOD

CROSS REFERENCE TO RELATED APPLICATIONS

The present application is a Continuation Application of PCT Application No. PCT/CN2019/082205 filed on Apr. 11, 2019, which claims the benefit of Chinese Patent Application No. 201810287969.X filed on Apr. 3, 2018. All the above are hereby incorporated by reference.

TECHNICAL FIELD

The present disclosure relates to the technical field of casing processing, in particular to packaging equipment for continuous automatic net sleeving of a casing, a shirring machine and a packaging method.

BACKGROUND ART

Casings are ideal materials for filling all kinds of sausages. The basic function of the casings is to ensure that the sausages do not deteriorate under a certain condition so as to meet the needs of storage and circulation. In the processing technology of the casings, shirring equipment is generally adopted to make artificial casings wound into a disc shape into hollow folded short sleeve tubes in advance. In the shirring production process of the artificial casings, because of elasticity properties of certain materials such as nylon, polyethylene and other plastic casings, casing shining sticks formed after shirring cannot be kept as straight short sticks after being demounted from shining rods, and start to stretch and show an S-shaped bent state, with the result that a single stick with higher meter cannot be obtained or the obtained sticks cannot penetrate into filling tubes easily.

A packaging mode for fixing a casing shirring stick is as follows: an elastic tubular long-strip nylon woven net bag is adopted to sleeve the casing shining stick before the casing shirring stick leaves a shirring rod, after the net bag and the casing shirring stick are taken down from the shirring rod simultaneously, the two ends of the net bag are tied through buckles or through hot-melting sealing and other ways, and the casing shining stick can keep in a straight short stick state in the net bag through the radial shrinkage performance of the net bag.

As for automatic net sleeving equipment in the past, a tubular net bag accommodating device (net bin) is often adopted to make a section of net bag be manually shined on the outer wall of the net bin. When demounted from a shirring rod, a casing shining stick penetrates into an inner hole of the net bin. Since one end of the net bag exposed outside the net bin has been tied in advance, the net bag wraps the casing shining stick to be released from the net bin while the casing shining stick is pushed out of the net bin. After the casing shining stick and the net bag wrapping the stick leave the net bin, the other end of the net bag is tied and cut off, so that the casing shirring stick is packaged.

Although the net sleeving equipment adopting the net bin can realize automatic net sleeving on a shirring machine, the net bin needs to be replaced frequently because the length of the net bag accommodated in the single net bin is limited. Moreover, sleeving the net bag on the net bin needs to be completed manually, which still needs to consume lots of manpower. A continuous automatic net sleeving device is urgently needed.

In the patent document WO2000025593A1, a method and device for packaging casings are put forward. After the tail end of a net bag for packaging a previous shined casing is welded and before the head end of a net bag for a latter shined casing is welded, the net bags are cut off between the tail end of the previous shined casing and the head end of the latter shined casing, wherein welding is conducted in two times and not conducted simultaneously. Besides, shined casings sleeve shining rods in a shirring machine to complete shining, and the shined casings are pushed into the device for packaging the casings by a pushing disc at the front end of a piston rod. Therefore, shirring of the casings and supplying of the shined casings into the device for packaging the casings cannot be well conducted continuously.

SUMMARY OF THE INVENTION

In view of defects of the above technical problems, the present disclosure aims to provide packaging equipment for continuous automatic net sleeving of a casing, a shirring machine and a casing packaging method. The packaging equipment for continuous automatic net sleeving of the casing can be in butt joint with casing shirring equipment to realize integrated processing of the casing. As well, by adopting the casing packaging method of the present disclosure, full-automatic production of casing packaging can be realized without manual participation, so that the efficiency is greatly improved. Moreover, the packaging equipment for continuous automatic net sleeving of the casing is suitable for shining casings with various diameters, and the situation that the net bags losing a part of shrinkage due to being opened by the net bin are unsuitable for packaging small-diameter casing shining sticks is avoided.

On the one hand, the present disclosure provides packaging equipment for continuous automatic net sleeving of a casing, including a shuttle, a first gripper, a second gripper, a casing conveying rod, a third gripper, a fourth gripper, a net bag cutting device, a packaged casing accommodating bin clamp and net bag tying devices. An outer circumferential face and shape of the shuttle is designed to be suitable for sleeving the shuttle with a net bag pulled out from a net bag roll, and an accommodating hole is formed in one end of the shuttle away from the net bag roll. The first gripper can be opened or closed to release or clamp and fix one end of the shuttle close to the net bag roll. The second gripper can drive an open end of the net bag to make reciprocating motion between a first position and a second position on the shuttle when being closed, and the second gripper can allow the net bag to move freely in a net bag conveying direction when being opened. The casing conveying rod is designed to be capable of carrying a shined casing to move to the end of the shuttle provided with the accommodating hole and to be inserted into the accommodating hole, and can be reset to a position away from the shuttle. The third gripper is configured to clamp the open end of the net bag and pull the net bag to sleeve the whole shirred casing in a penetrating mode. The fourth gripper is configured to pull the net bag so as to unwind the net bag from the net bag roll, and the fourth gripper is designed to be capable of moving with the third gripper. The net bag cutting device is configured to cut the net bag between the end of the shuttle provided with the accommodating hole and one end of the shirred casing close to the shuttle. The packaged casing accommodating bin clamp is configured to clamp the shirred casing packaged with the net bag and capable of fixing the shirred casing leaving the casing conveying rod and conveying the shined casing to a tying position when the casing conveying rod is reset. The net bag tying devices are configured to tie two ends of the net bag exposed at two ends of the packaged casing accommodating bin clamp.

Preferably, the first position is close to the end of the shuttle provided with the accommodating hole, and the second position is located between the other end of the shuttle and the first position. When the second gripper drives the open end of the net bag to move from the second position to the first position, the open end of the net bag extends out of the end of the shuttle provided with the accommodating hole. When the second gripper drives the open end of the net bag to move from the first position to the second position, the open end of the net bag goes back to the shuttle.

Preferably, an inner side of the second gripper is provided with fine teeth to bite the net bag. The second gripper exactly presses the net bag sleeving the shuttle but does not clamp the shuttle when being closed, so as to drive the open end of the net bag to make reciprocating motion between the first position and the second position on the shuttle.

Preferably, the packaging equipment for continuous automatic net sleeving of the casing further includes a discharging sliding sleeve. The discharging sliding sleeve sleeves the casing conveying rod, is located between the shined casing and a rod handle of the casing conveying rod and is configured to demount the shined casing from the casing conveying rod.

Preferably, the accommodating hole is designed to be in sliding fit with the casing conveying rod in size, and is capable of ensuring that when the casing conveying rod is inserted into the accommodating hole, the shuttle does not shake.

Preferably, the packaging equipment for continuous automatic net sleeving of the casing is provided with a plurality of casing conveying rods capable of being switched in position.

Preferably, a short sleeve tube is located at a center of the third gripper, and an inner hole of the short sleeve tube is slightly greater than an outer diameter of the shirred casing. The open end of the net bag is opened to sleeve an outer wall of the short sleeve tube of the third gripper.

Preferably, the third gripper is designed to be capable of making reciprocating motion between the discharging sliding sleeve and the end of the shuttle provided with the accommodating hole in an axial direction of the casing conveying rod.

On the other hand, the present disclosure further provides a casing packaging method, including the following steps: closing a first gripper to clamp and fix one end of a shuttle sleeved with a net bag and moving a third gripper towards the shuttle in an axial direction of a casing conveying rod so as to closely abut against the other end of the shuttle; closing a second gripper to drive an open end of the net bag to move from a second position to a first position so as to enable the open end of the net bag to extend out of an end face of the shuttle, opening the open end of the net bag to sleeve an outer wall of a short sleeve tube of the third gripper and then opening the second gripper; moving the casing conveying rod sleeved with a shined casing towards the shuttle to penetrate through the third gripper so as to be inserted into an accommodating hole of the shuttle, and opening the first gripper at the moment; closing the third gripper to clamp the open end of the net bag, closing a fourth gripper to clamp the net bag, moving the third gripper and the fourth gripper synchronously to a rod handle direction of the casing conveying rod by a length required for packaging the shined casing by the net bag, and sleeving the shined casing with the net bag in a penetrating mode; closing the first gripper to fix the shuttle, and moving the casing conveying rod in a direction away from the shuttle till the casing conveying rod is pulled out of the accommodating hole of the shuttle; forming a sufficient gap between the casing conveying rod and the shuttle to allow a net bag cutting device to extend out to cut off the net bag and then reset; opening the fourth gripper and continuing to move the third gripper in the direction away from the shuttle till the short sleeve tube clamping the net bag sleeves a section of a discharging sliding sleeve close to the shirred casing in a penetrating mode, and closing the second gripper to drive the open end of the net bag to move from the first position to the second position; closing a packaged casing accommodating bin clamp to clamp and fix the shirred casing packaged with the net bag, wherein a length of the net bag sleeving the shined casing in the penetrating mode is greater than a length of the shined casing, and extending the bag with a certain length for tying out of two ends of the packaged casing accommodating bin clamp; continuing to move the casing conveying rod axially in the direction away from the shuttle, fixing the discharging sliding sleeve with a discharging clamp at the moment and demounting the shined casing from the casing conveying rod; moving the packaged casing accommodating bin clamp carrying the shined casing packaged with the net bag to a tying position; tying two ends of the net bag exposed at two ends of the packaged casing accommodating bin clamp by net bag tying devices; and opening the packaged casing accommodating bin clamp, and placing the shined casing packaged with the net bag on a finished-product tray.

In order to improve the working efficiency, a plurality of casing conveying rods can be alternated. Preferably, the casing packaging method further includes the following steps: switching another casing conveying rod sleeved with a shined casing to a position of the current casing conveying rod after enabling the casing conveying rod to move in the direction away from the shuttle till the shined casing is demounted, then moving the casing conveying rod at the current position towards the shuttle, and repeating all the subsequent steps till the shined casing packaged with the net bag falls down to leave the packaging equipment for continuous automatic net sleeving of the casing.

Preferably, the casing packaging method further includes the following step: when the packaging equipment for continuous automatic net sleeving of the casing is used for the first time after newly purchased or the packaging equipment for continuous automatic net sleeving of the casing is used for the first time after a net bag roll is used up, pulling the net bag out from the net bag roll to sequentially penetrate through the fourth gripper, the first gripper and the second gripper so as to enable the net bag to sleeve the shuttle in a penetrating mode to sleeve the short sleeve tube of the third gripper.

In another aspect, the present disclosure further provides a casing shining machine. The shirring machine includes any one of the above packaging equipment for continuous automatic net sleeving of the casing.

Those skilled in the art easily understand that using of the casing conveying rod can be linked with casing shining conducted through a multi-rod shining machine. Because the shined casing always sleeves the rod (whether a casing shining rod or the casing conveying rod) before being inserted into the accommodating hole of the shuttle, and a process of pushing by a piston is omitted.

The packaging equipment for continuous automatic net sleeving of the casing and the casing packaging method provided by the present disclosure realize full-automatic casing packaging after casing shining equipment, and frequent replacing of net bags due to changing of hole diameters of casings is avoided. In the present disclosure, the net bag roll usually can be very long, and as long as the net bag roll is not used up, production can last for a long time without replacing the net bag.

BRIEF DESCRIPTION OF THE DRAWINGS

FIGS. 2a-2i correspond to FIGS. 1a-1i and are views in a direction of an arrow A in FIG. 1a;

Figure 1A:
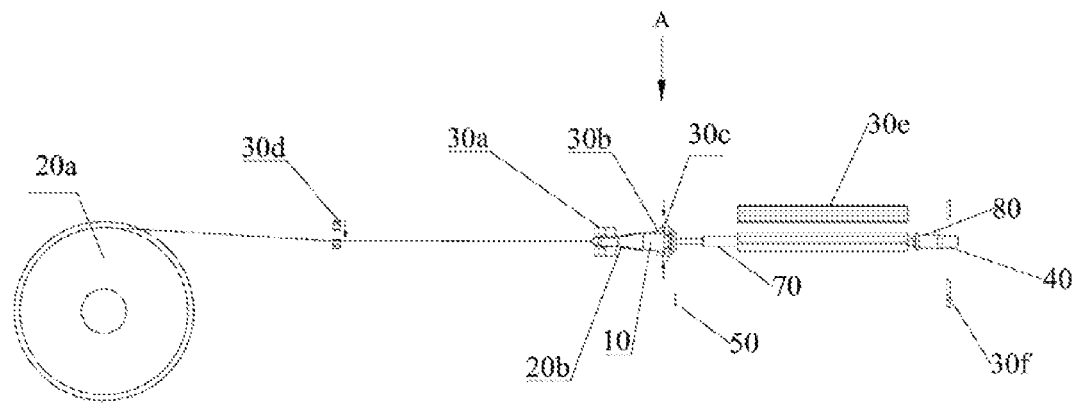
FIG. 1a shows a schematic structural diagram of a first working state of an automatic net bag packaging device, in this state, first and second grippers are opened, and third and fourth grippers are about to change from opening to closing.

In the drawings: shuttle—10; outer circumferential face—12; accommodating hole—14; first position—16; second position—18; net bag roll—20a; net bag—20b; first gripper—30a; second gripper—30b; third gripper—30c; fourth gripper—30d; packaged casing accommodating bin clamp—30e; discharging clamp—30f; fine tooth—32; short sleeve tube—34; casing conveying rod—40; net bag cutting device—50; net bag tying device—60; shirred casing—70; and discharging sliding sleeve—80.

DETAILED DESCRIPTION OF THE INVENTION

Packaging equipment for continuous automatic net sleeving of a casing, a shirring machine and a casing packaging method of the present disclosure are described in detail below with reference to the drawings. It needs to be noted that the drawings are only used for exemplary description and should not be understood as limitations to the present disclosure.

FIGS. 1a-1i and FIGS. 2a-2i show schematic structural diagrams of different working states of an automatic net bag packaging device. As shown in FIGS. 1a-1i and FIGS. 2a-2i, the packaging equipment for continuous automatic net sleeving of the casing is provided with a shuttle (10), a first gripper (30a), a second gripper (30b), a casing conveying rod (40), a third gripper (30c), a fourth gripper (30d), a net bag cutting device (50), a packaged casing accommodating bin clamp (30e) and net bag tying devices (60). An outer circumferential face (12) and shape of the shuttle (10) is designed to be suitable for sleeving the shuttle (10) with a net bag (20b) pulled out from a net bag roll (20a), and an accommodating hole (14) is formed in one end of the shuttle (10) away from the net bag roll (20a). The first gripper (30a) can be opened or closed to release or clamp and fix one end of the shuttle (10) close to the net bag roll (20a). The second gripper (30b) can drive an open end of the net bag (20b) to make reciprocating motion between a first position (16) and a second position (18) on the shuttle (10) when being closed, and the second gripper (30b) can allow the net bag (20b) to move freely in a net bag conveying direction when being opened. The casing conveying rod (40) is designed to be capable of carrying a shined casing (70) to move to the end of the shuttle (10) provided with the accommodating hole

(14) and to be inserted into the accommodating hole (14), and can be reset to a position away from the shuttle (10). The third gripper (30c) is configured to clamp the open end of the net bag (20b) and pull the net bag to sleeve the whole shined casing (70) in a penetrating mode. The fourth gripper (30d) is configured to pull the net bag (20b) so as to unwind the net bag (20b) from the net bag roll (20a), and the fourth gripper (30d) is designed to be capable of moving with the third gripper (30c). The net bag cutting device (50) is configured to cut off the net bag (20b) between the end of the shuttle (10) provided with the accommodating hole (14) and one end of the shined casing (70) close to the shuttle (10). The packaged casing accommodating bin clamp (30e) is configured to clamp the shined casing packaged with the net bag and capable of fixing the shined casing leaving the casing conveying rod (40) and conveying the shined casing to a tying position when the casing conveying rod (40) is reset. The net bag tying devices (60) are configured to tie two ends of the net bag (20b) exposed at two ends of the packaged casing accommodating bin clamp (30e).

Figure 2A:
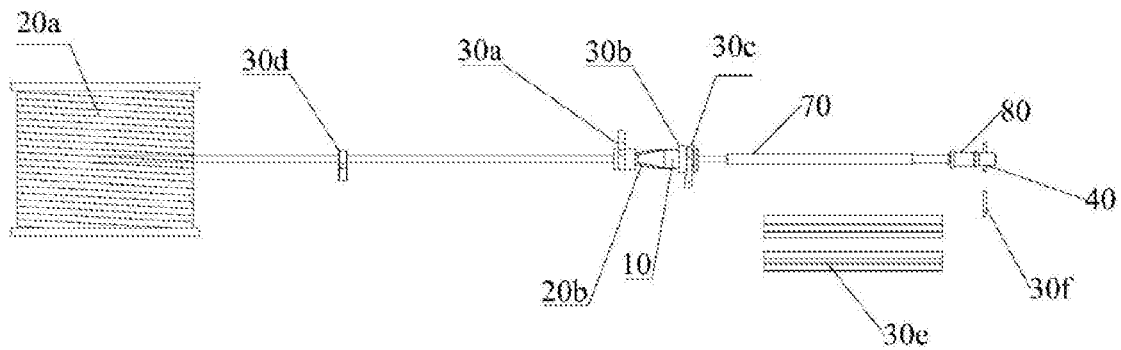

Specifically, as shown in FIG. 1a and FIG. 2a, in this state, the first and second grippers are opened, the third and fourth grippers are about to change from opening to closing. After a shining process of a full-automatic shirring machine, a casing is shirred-formed and segmented according to a set length. One end on the casing conveying rod (40) (or called shining rod) close to a rod handle has a section of shined casing. In a working state as show in FIG. 1a, one end of the casing conveying rod (40) is inserted into the accommodating hole (14) in an end face of the shuttle (10), and an inserting depth may be 2-3 cm. The accommodating hole (14) is designed to be in sliding fit with the casing conveying rod (40) in size, and is capable of ensuring that when the casing conveying rod is inserted into the accommodating hole (14) of the shuttle (10), the shuttle (10) penetrates the casing conveying rod (40) without shaking.

In an initial state, the grippers (30a)-(30d) and the packaged casing accommodating bin clamp (30e) are all in an opened state, and the second gripper (30b) is located at the first position (16). When the packaging equipment for continuous automatic net sleeving of the casing is used for the first time after newly purchased or the packaging equipment for continuous automatic net sleeving of the casing is used for the first time after a net bag roll (20a) is used up, the net bag (20b) is pulled out from the net bag roll (20a) to sequentially penetrate through the fourth gripper (30d), the first gripper (30a) and the second gripper (30b), so that the net bag (20b) sleeves the shuttle (10) and extends out of the shuttle by a certain distance such as 2-3 cm to sleeve a short sleeve tube (34) of the third gripper (30c).

Figure 1B:
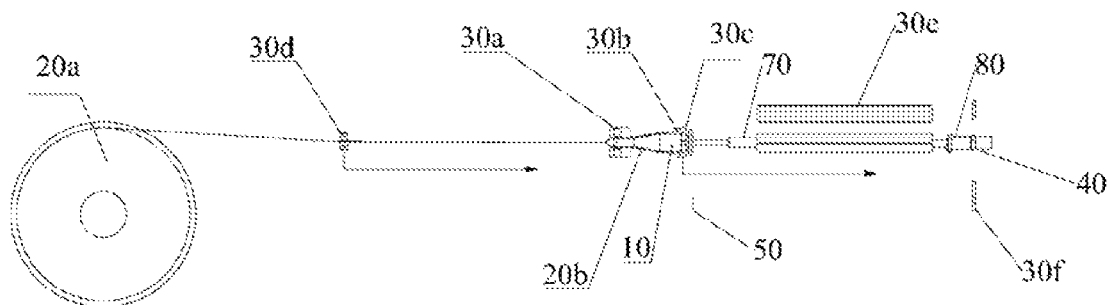
FIG. 1b shows a schematic structural diagram of a second working state of the automatic net bag packaging device, in this state, the first and second grippers keep opened, and the third and fourth grippers are closed to pull a net bag to move to a rod handle direction.
Figure 2B:
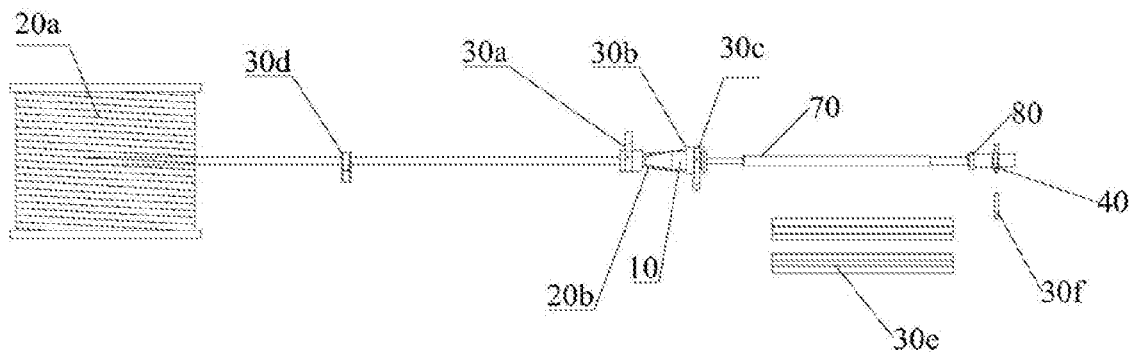
Figure 5:
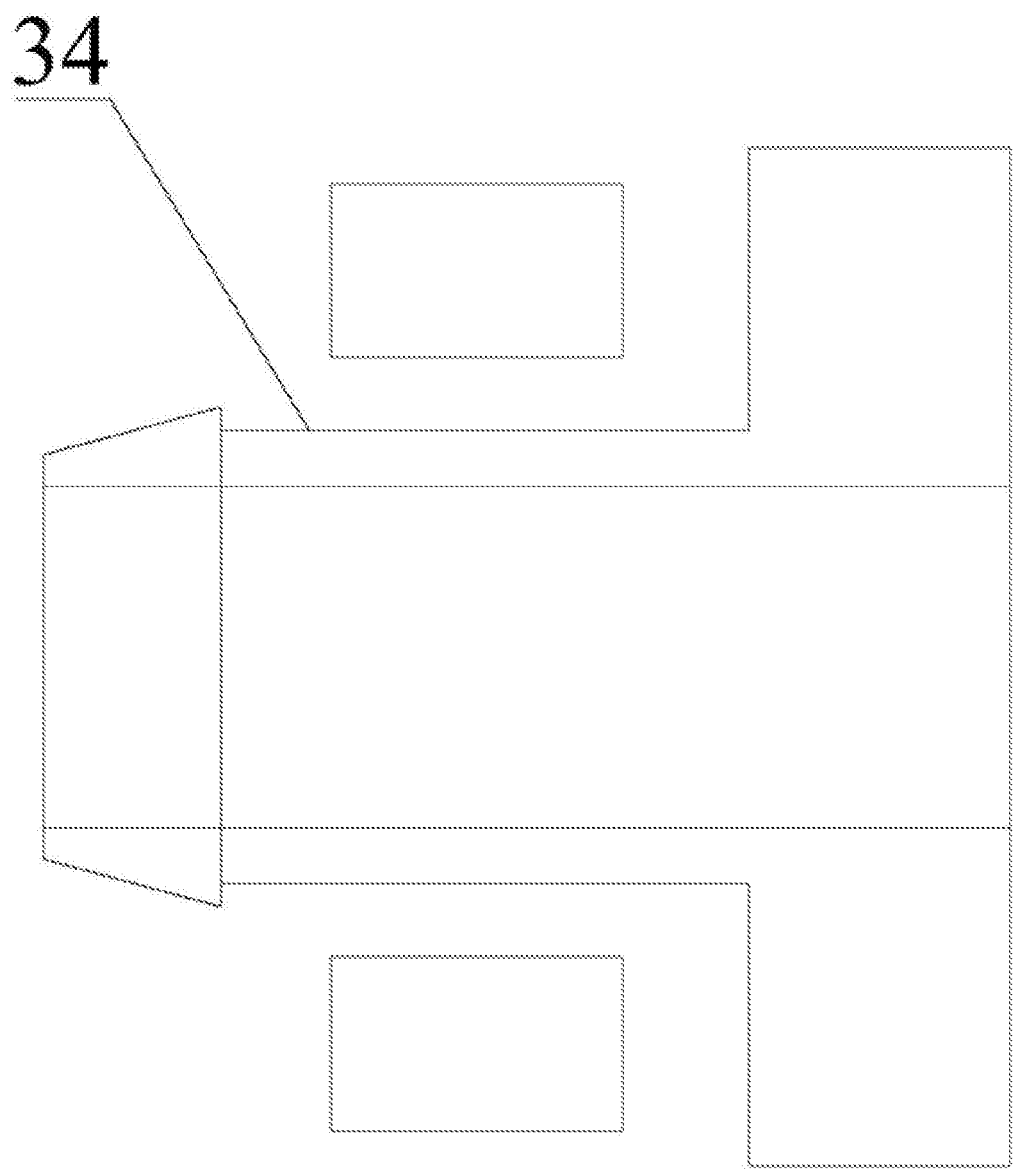
FIG. 5 shows a schematic structural diagram of the third gripper.

Then, as shown in FIG. 1b and FIG. 2b, the first gripper (30a) and the second gripper (30b) keep opened, and the third gripper (30c) and the fourth gripper (30d) are closed and pull the net bag (20b) to move in a rod handle direction. Further, as shown in FIG. 5, the short sleeve tube (34) is located at a center of the third gripper (30c), an inner hole of the short sleeve tube (34) is slightly greater than an outer diameter of the shirred casing (70). The open end of the net bag (20b) is opened to sleeve an outer wall of the short sleeve tube (34) of the third gripper (30c). A stroke of moving of the third gripper (30c) and the fourth gripper (30d) in an axial direction of a rod handle is slightly greater than a length of the shined casing (70), for example, the stroke can be 3-5 cm longer than the length of the shined casing (70).

Figure 1C:
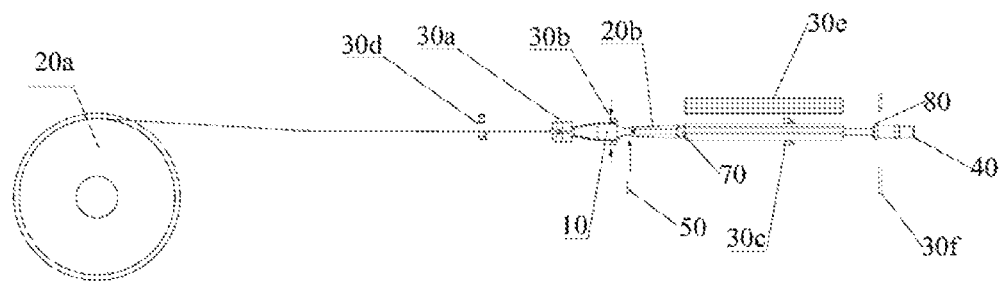
FIG. 1c shows a schematic structural diagram of a third working state of the automatic net bag packaging device, in this state, the first gripper is about to close, the second gripper keeps opened, the third gripper keeps closed, the fourth gripper is about to open, and a casing conveying rod is about to move in a direction away from a shuttle.
Figure 2C:
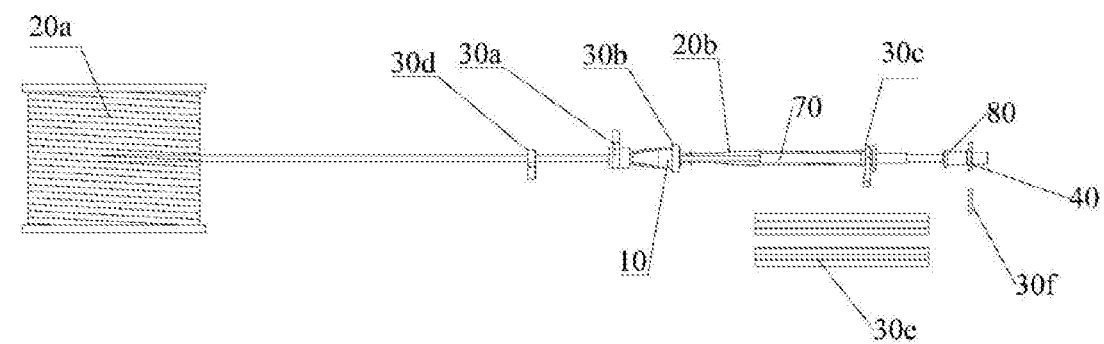

Then, as shown in FIG. 1c and FIG. 2c, the first gripper (30a) is about to close, the second gripper (30b) keeps opened, the third gripper (30c) keeps closed, the fourth gripper (30d) is about to open, and the casing conveying rod (40) is about to move in a direction away from the shuttle (10).

Figure 1D:
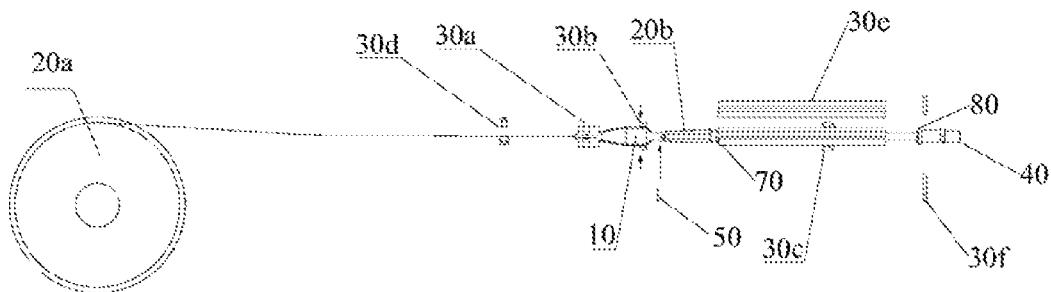
FIG. 1d shows a schematic structural diagram of a fourth working state of the automatic net bag packaging device, in this state, the first gripper is closed, the second gripper is about to close, a net bag cutting device is started, the third gripper keeps closed, and the fourth gripper is opened.
Figure 2D:
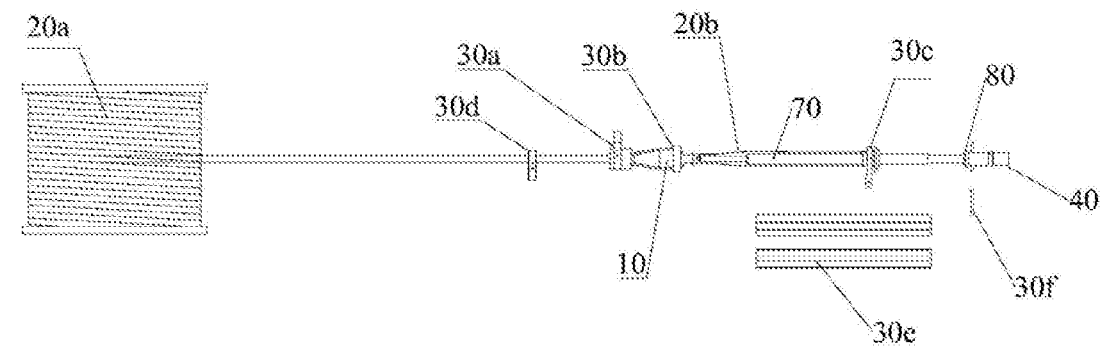

Then, as shown in FIG. 1d and FIG. 2d, the first gripper (30a) is closed to fix the shuttle (10), the second gripper (30b) is about to close, the net bag cutting device (50) is about to start, the third gripper (30c) keeps closed, and the fourth gripper (30d) is opened. Once the first gripper (30a) fixes the shuttle (10), the casing conveying rod (40) can move in the direction away from the shuttle (10) till the casing conveying rod (40) is pulled out of the accommodating hole (14) of the shuttle (10), and spacing between the casing conveying rod (40) and the shuttle (10) is greater than 3 cm.

Figure 1E:
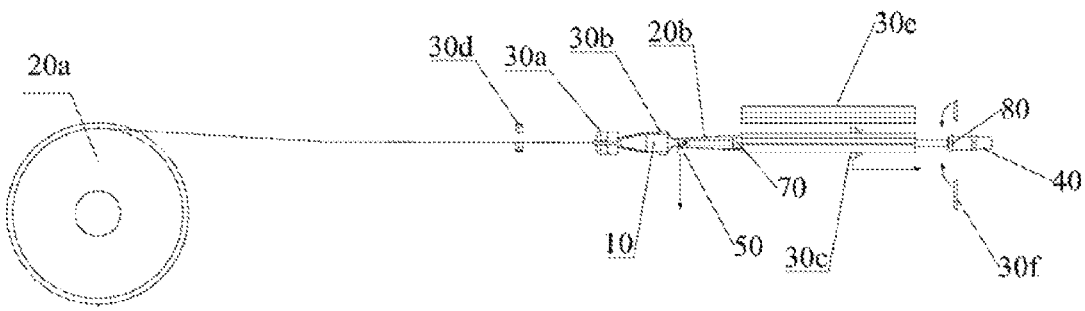
FIG. 1e shows a schematic structural diagram of a fifth working state of the automatic net bag packaging device, in this state, the first gripper keeps closed, the second gripper is closed, the net bag cutting device extends out and cuts off the net bag, the third gripper keeps closed and is about to move to the rod handle direction, the fourth gripper keeps opened, a packaged casing accommodating bin clamp keeps opened and is about to move towards the casing conveying rod, and a discharging clamp is about to change from opening to closing.
Figure 2E:
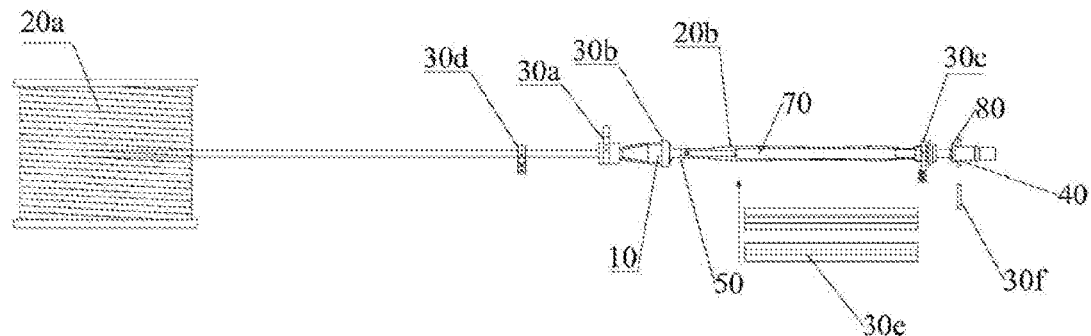

Then, as shown in FIG. 1e and FIG. 2e, the first gripper (30a) keeps closed, the second gripper (30b) is closed, the net bag cutting device (50) extends out and cuts off the net bag (20b), the third gripper (30c) keeps closed and is about to move to the rod handle direction, the fourth gripper (30d) keeps opened, and the packaged casing accommodating bin clamp (30e) keeps opened and is about to move towards the casing conveying rod (40). From FIGS. 1a-1e, it can also be seen that the packaging equipment for continuous automatic net sleeving of the casing further includes a discharging sliding sleeve (80) and a discharging clamp (30f). The discharging sliding sleeve (80) sleeves the casing conveying rod (40) and is located between the shined casing (70) and the rod handle of the casing conveying rod (40). When the casing conveying rod (40) axially moves in the direction away from the shuttle (10), the discharging sliding sleeve (80) is fixed with the discharging clamp (300, the discharging sliding sleeve pushes the shined casing (70) to move relative to the casing conveying rod (40), and thus the shined casing (70) is demounted from the casing conveying rod (40). The discharging clamp (30f) is about to change from opening to closing.

Figure 1F:
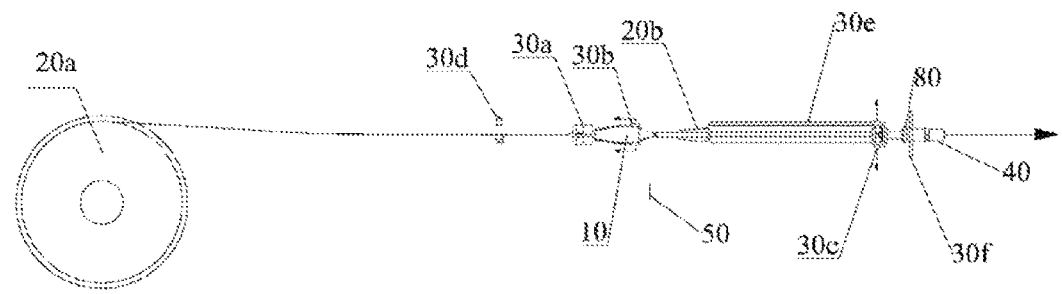
FIG. 1f shows a schematic structural diagram of a sixth working state of the automatic net bag packaging device, in this state, the first gripper keeps closed, the second gripper keeps closed and moves from a first position to a second position, the third gripper is about to open, the fourth gripper keeps opened, the packaged casing accommodating bin clamp is closed to clamp a shined casing packaged with the net bag, the discharging clamp is closed, and the casing conveying rod moves in a direction away from the shuttle.
Figure 2F:
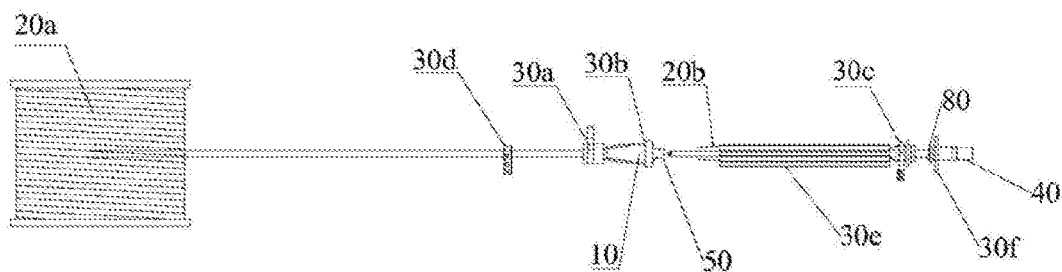
Figure 4:
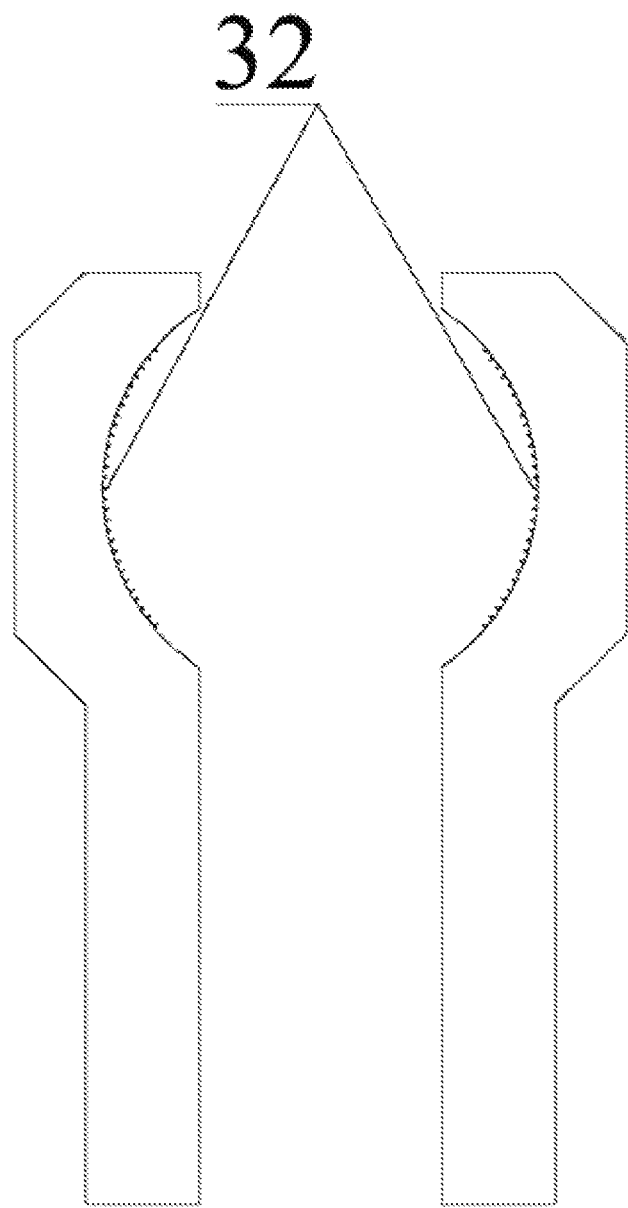
FIG. 4 shows a schematic structural diagram of the second gripper.

Then, as shown in FIG. 1f and FIG. 2f, the first gripper (30a) keeps closed, and the second gripper (30b) keeps closed and moves from the first position (16) to the second position (18). The third gripper (30c) continues moving to the rod handle direction till being sleeved with the discharging sliding sleeve (80), and the third gripper (30c) is about to open. The fourth gripper (30d) keeps opened. The packaged casing accommodating bin clamp (30e) is closed to clamp the shirred casing (70) packaged with the net bag (20b). The discharging clamp (30f) is closed to clamp the discharging sliding sleeve (80). The casing conveying rod moves in the direction away from the shuttle. At the moment, the net bag cutting device (50) has been reset and prepares to enter the next cycle. In one preferred embodiment of the present disclosure, the third gripper (30c) is designed to be capable of making reciprocating motion between the discharging sliding sleeve (80) and the end of the shuttle (10) provided with the accommodating hole (14) in an axial direction of the casing conveying rod (40). Further, as shown in FIG. 4, an inner side of the second gripper (30b) is provided with fine teeth (32) to bite the net bag (20b). The second gripper (30b) exactly presses the net bag (20b) sleeving the shuttle (10) but does not clamp the shuttle (10) when being closed, so that the open end of the net bag (20b) is driven to make reciprocating motion between the first position (16) and the second position (18) on the shuttle (10).

Figure 1G:
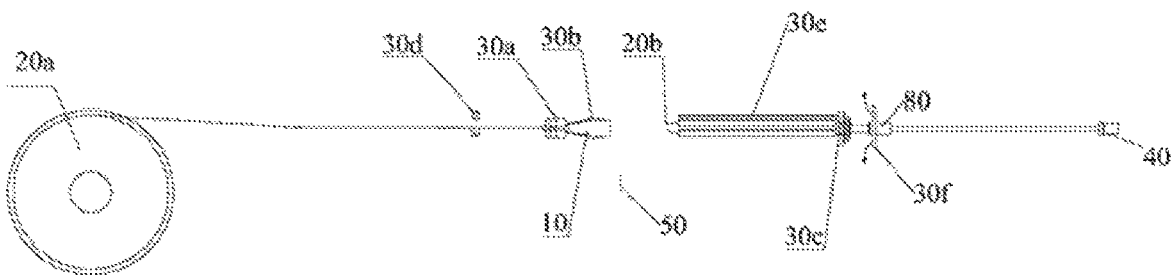
FIG. 1g shows a schematic structural diagram of a seventh working state of the automatic net bag packaging device, in this state, the first gripper keeps closed, the second gripper keeps closed, the third gripper is opened, the fourth gripper keeps opened, the packaged casing accommodating bin clamp keeps closed and is about to get away from the casing conveying rod to move to a tying position, and the discharging clamp is about to open.
Figure 2G:
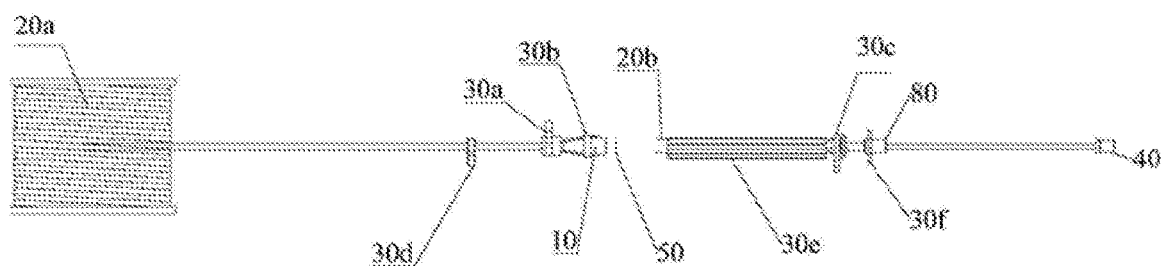

Then, as shown in FIG. 1g and FIG. 2g, the first gripper (30a) keeps closed, the second gripper (30b) keeps closed, the third gripper (30c) is opened, and the fourth gripper (30d) keeps opened. The casing conveying rod (40) continues moving in the direction away from the shuttle (10) to demount the shirred casing (70). The packaged casing accommodating bin clamp (30e) keeps closed and is about to get away from the casing conveying rod (40) to move to a tying position, and the discharging clamp (30f) is about to open.

Figure 1H:
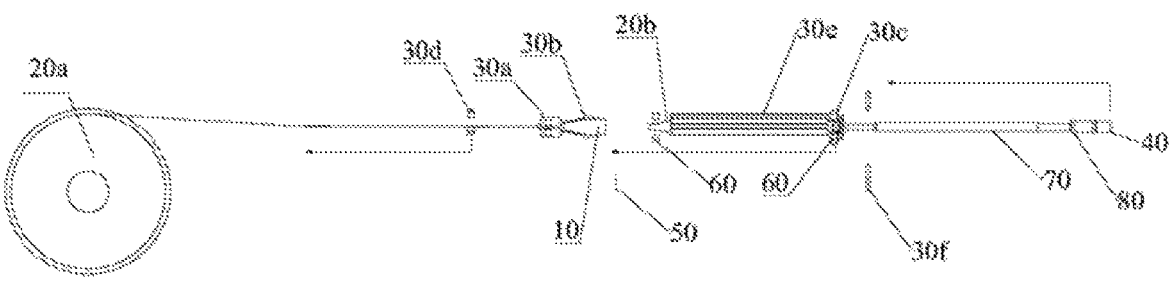
FIG. 1h shows a schematic structural diagram of an eighth working state of the automatic net bag packaging device, the first gripper keeps closed, the second gripper keeps closed, the third gripper keeps opened and moves towards the shuttle, the fourth gripper keeps opened and moves towards a net bag roll, the packaged casing accommodating bin clamp keeps closed and moves to the tying position, tying devices perform tying, the discharging clamp is opened, and a next casing conveying rod is about to move towards the shuttle.
Figure 2H:
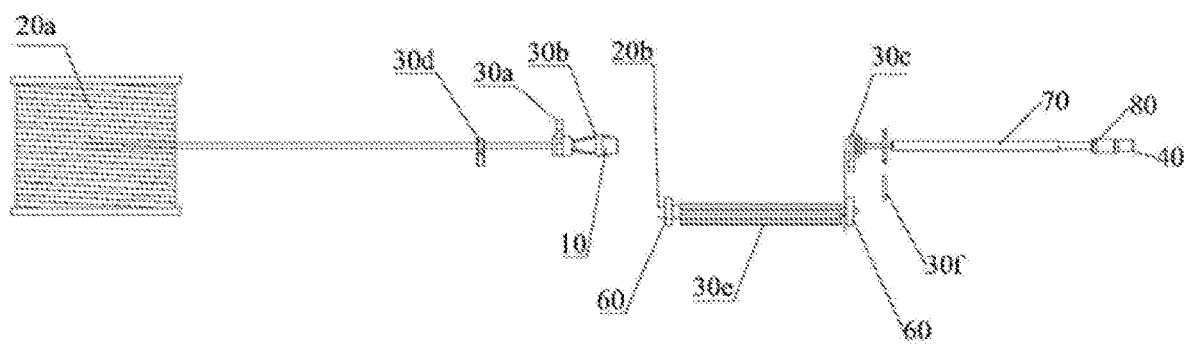

Then, as shown in FIG. 1h and FIG. 2h, the first gripper (30a) keeps closed, the second gripper (30b) keeps closed, the third gripper (30c) keeps opened and moves towards the shuttle (10), and the fourth gripper (30d) keeps opened and moves towards the net bag roll (20a). The packaged casing accommodating bin clamp (30e) keeps closed and moves to the tying position, and the net bag tying devices (60) perform tying. The discharging clamp (30f) is opened. A next casing conveying rod (40) is about to move towards the shuttle (10).

Figure 1I:
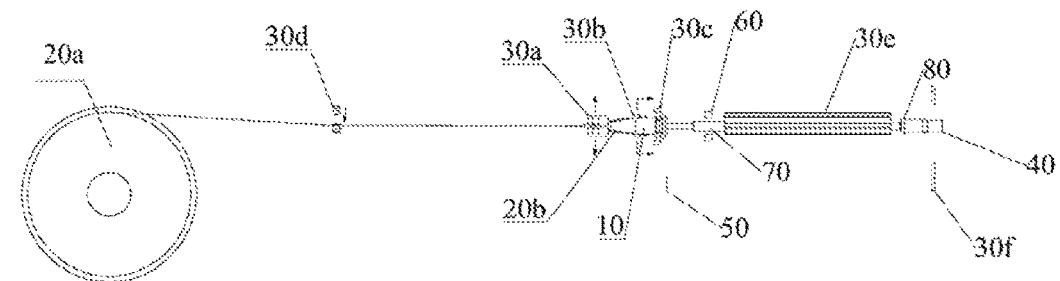
FIG. 1i shows a schematic structural diagram of a ninth working state of the automatic net bag packaging device, the next casing conveying rod penetrates through the third gripper to be inserted into an accommodating hole of the shuttle, the first gripper is about to change from closing to opening, the second gripper moves from the second position to the first position and then is opened, the third gripper closely abuts against the shuttle and is about to close, the fourth gripper is about to close, the packaged casing accommodating bin clamp is opened, and the shirred casing packaged with the net bag is placed on a finished-product tray.
Figure 2I:
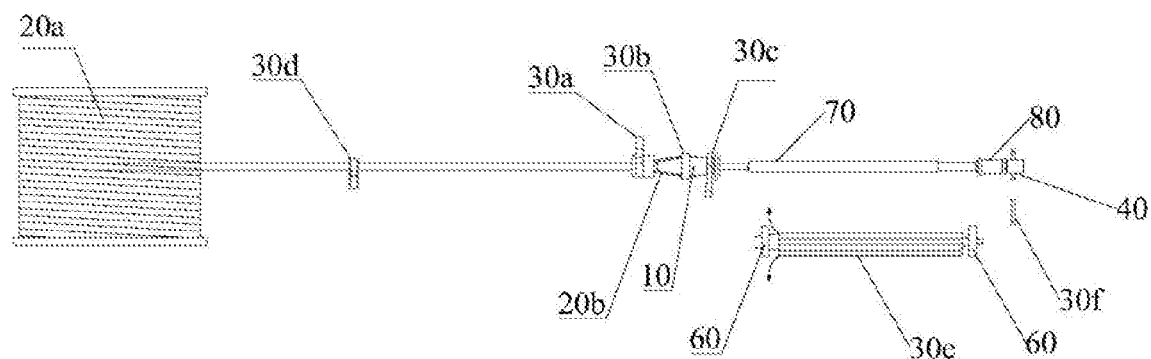

Then, as shown in FIG. 1i and FIG. 2i, the next casing conveying rod (40) penetrates through the third gripper (30c) to be inserted into the accommodating hole (14) of the shuttle (10). The first gripper (30a) is about to change from closing to opening. The second gripper (30b) moves from the second position (18) to the first position (16) and then is opened. The third gripper (30c) closely abuts against the shuttle and is about to close. The fourth gripper (30d) is about to close. The packaged casing accommodating bin clamp (30e) is opened. The shined casing (70) packaged with the net bag is placed on a finished-product tray. Then, the packaging equipment for continuous automatic net sleeving of the casing further enters into the working state as shown in FIG. 1a and circulates in this way till the device is manually shut down or all net bags in the net bag roll (20a) are used up.

Figure 3:
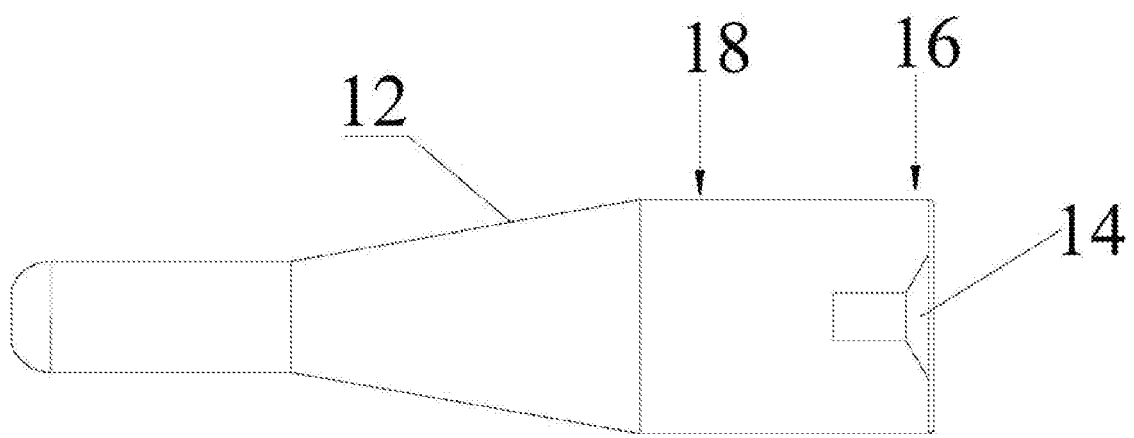
FIG. 3 shows a schematic structural diagram of the shuttle.

Further, as shown in FIG. 1a and FIG. 3, the first position (16) is close to the end of the shuttle (10) provided with the accommodating hole (14), and the second position (18) is located between the other end of the shuttle (10) and the first position (16). As shown in FIG. 1f and FIG. 2f, when the second gripper (30b) drives the open end of the net bag (20b) to move from the second position (18) to the first position (16), the open end of the net bag (20b) extends out of the end of the shuttle (10) provided with the accommodating hole (14). As shown in FIG. 1i and FIG. 2i, when the second gripper (30b) drives the open end of the net bag (20b) to move from the first position to the second position, the open end of the net bag (20b) goes back to the shuttle (10).

It should be understood that in order to improve the efficiency of automatic production, the packaging equipment for continuous automatic net sleeving of the casing is provided with a plurality of casing conveying rods which are not shown and are capable of being switched in position. Shined casings can be alternately and continuously supplied to the casing conveying rods of the packaging equipment for continuous automatic net sleeving of the casing from shirring rods of a frontally-connected shining machine.

A casing packaging method realized based on the packaging equipment for continuous automatic net sleeving of the casing is described as follows. The casing packaging method includes the steps: a first gripper (30a) is closed to clamp and fix one end of a shuttle (10) sleeved with a net bag (20b), and a third gripper (30c) moves towards the shuttle (10) in an axial direction of a casing conveying rod (40) to closely abut against the other end of the shuttle (10); a second gripper (30b) is closed and drives an open end of the net bag (20b) to move from a second position to a first position so as to enable the open end of the net bag (20b) to extend out of an end face of the shuttle (10), the open end of the net bag (20b) is opened to sleeve an outer wall of a short sleeve tube (34) of the third gripper (30c), and then the second gripper (30b) is opened; the casing conveying rod (40) sleeved with a shined casing (70) moves towards the shuttle (10) and penetrates through the third gripper (30c) to be inserted into an accommodating hole (14) of the shuttle (10), and the first gripper (30a) is opened at the moment; the third gripper (30c) is closed to clamp the open end of the net bag (20b), a fourth gripper (30d) is closed to clamp the net bag (20b), the third gripper (30c) and the fourth gripper (30d) synchronously move to a rod handle direction of the casing conveying rod (40) by a length required for packaging the shined casing by the net bag, and the net bag (20b) sleeves the shined casing (70) in a penetrating mode; the first gripper (30a) is closed to fix the shuttle (10), the casing conveying rod (40) moves in a direction away from the shuttle (10) till the casing conveying rod (40) is pulled out of the accommodating hole (14) of the shuttle (10); a sufficient gap is formed between the casing conveying rod (40) and the shuttle (10) to allow a net bag cutting device (50) to extend out to cut off the net bag (20b) and then reset; the fourth gripper (30d) is opened, the third gripper (30c) continues to move in the direction away from the shuttle (10) till the short sleeve tube (34) clamping the net bag (20b) sleeves a section of a discharging sliding sleeve (80) close to the shined casing in a penetrating mode, and the second gripper (30b) is closed and drives the open end of the net bag (20b) to move from the first position to the second position; a packaged casing accommodating bin clamp (30e) is closed to clamp and fix the shirred casing (70) packaged with the net bag (20b), a length of the net bag sleeving the shirred casing (70) in the penetrating mode is greater than a length of the shirred casing (70), and the net bag with a certain length for tying extends out of two ends of the packaged casing accommodating bin clamp (30e); the casing conveying rod (40) continues moving axially in the direction away from the shuttle, the discharging sliding sleeve (80) is clamped and fixed with a discharging clamp (300 at the moment, and the shirred casing (70) is demounted from the casing conveying rod (40); the packaged casing accommodating bin clamp (30e) carries the shined casing packaged with the net bag (20b) to move to a tying position; two ends of the net bag (20b) exposed at two ends of the packaged casing accommodating bin clamp (30e) are tied by net bag tying devices (60); and the packaged casing accommodating bin clamp (30e) is opened, and the shined casing (70) packaged with the net bag is placed on a finished-product tray.

It should be understood that in order to improve the efficiency of automatic production, the packaging equipment for continuous automatic net sleeving of the casing is provided with a plurality of casing conveying rods which are not shown and are capable of being switched in position. In one preferred embodiment of the present disclosure, another casing conveying rod (40) sleeved with a shined casing is switched to a position of the current casing conveying rod (40) after the casing conveying rod (40) moves in the direction away from the shuttle (10) till the shined casing (70) is demounted. Then the casing conveying rod (40) at the current position moves towards the shuttle (10), and all the subsequent steps are repeated till the shined casing (70) packaged with the net bag (20b) falls down to leave the packaging equipment for continuous automatic net sleeving of the casing.

When the packaging equipment for continuous automatic net sleeving of the casing is used for the first time after newly purchased or the packaging equipment for continuous automatic net sleeving of the casing is used for the first time after the net bag roll (20a) is used up, the net bag (20b) is pulled out from the net bag roll (20a) to sequentially penetrate through the fourth gripper (30d), the first gripper (30a) and the second gripper (30b), so that the net bag (20b) sleeves the shuttle (10) in a penetrating mode to sleeve the short sleeve tube (34) of the third gripper (30c).

It should be understood that the step splitting mode of the above packaging method is not limited to the above described mode. In the present disclosure, casing packaging is a continuous circulating process, and no definite starting point or endpoint exists. That is, the casing packaging method can pause at any time point and can continue working at any pausing point without any manual interference. In other words, any time point in the circulating process can be regarded as a starting point of casing packaging. In addition, in the above steps described by the present disclosure, many steps do not have an obvious sequential order and are in a parallel relationship. Therefore, technical solutions produced by replacing the starting point of the steps or disturbing certain orders all belong to the scope of protection of the present disclosure.

According to another aspect of the present disclosure, the present disclosure further provides a shining machine. The shining machine includes any one of the above-described packaging equipment for continuous automatic net sleeving of the casing. By adopting the shirring machine, artificial casings wound into a disc shape can be made into hollow folded short sleeve tubes, and then the shined casings are sleeved with nets to form final products. Whole shining and net sleeving processes are conducted fully automatically, coherently and continuously without any manual interference so that the production efficiency can be improved greatly.

The preferred embodiments of the present disclosure are recorded above, but the spirit and scope of the present disclosure are not limited to the specific contents disclosed herein. Those skilled in the art can make more implementations and applications according to the teachings of the present disclosure, all of which are within the spirit and scope of the present disclosure. The spirit and scope of the present disclosure are not limited by specific embodiments, but by claims.

What is claimed is:

1. Packaging equipment for continuous automatic net sleeving of a casing, comprising:
    a shuttle (10), wherein an outer circumferential face (12) and shape of the shuttle (10) is designed to be suitable for sleeving the shuttle (10) with a net bag (20b) pulled from a net bag roll (20a), and an accommodating hole (14) is formed in one end of the shuttle (10) away from the net bag roll (20a);
    a first gripper (30a), wherein the first gripper (30a) is capable of being opened or closed to release or clamp and fix one end of the shuttle (10) close to the net bag roll (20a);
    a second gripper (30b), wherein the second gripper (30b) is capable of driving an open end of the net bag (20b) to make reciprocating motion between a first position and a second position on the shuttle (10) when being closed, and the second gripper (30b) is capable of allowing the net bag (20b) to move freely in a net bag conveying direction when being opened;
    a casing conveying rod (40), wherein the casing conveying rod (40) is designed to be capable of carrying a shined casing (70) to move to the end of the shuttle (10) provided with the accommodating hole (14) and to be inserted into the accommodating hole (14), and is capable of being reset to a position away from the shuttle (10);
    a third gripper (30c), configured to clamp the open end of the net bag (20b) and pull the net bag to sleeve the whole shined casing (70) in a penetrating mode;
    a fourth gripper (30d), configured to pull the net bag (20b) so as to unwind the net bag (20b) from the net bag roll (20a), wherein the fourth gripper (30d) is designed to be capable of moving with the third gripper (30c);
    a net bag cutting device (50), configured to cut the net bag (20b) between the end of the shuttle (10) provided with the accommodating hole (14) and one end of the shined casing (70) close to the shuttle (10);
    a packaged casing accommodating bin clamp (30e), configured to clamp the shirred casing packaged with the net bag and to be capable of fixing the shirred casing leaving the casing conveying rod (40) and conveying the shirred casing to a tying position when the casing conveying rod (40) is reset; and
    net bag tying devices (60), configured to tie two ends of the net bag (20b) exposed at two ends of the packaged casing accommodating bin clamp (30e).

2. The packaging equipment for continuous automatic net sleeving of the casing according to claim 1, wherein the first position is close to the end of the shuttle (10) provided with the accommodating hole (14), and the second position is located between the other end of the shuttle (10) and the first position; when the second gripper (30b) drives the open end of the net bag (20b) to move from the second position to the first position, the open end of the net bag (20b) extends out of the end of the shuttle (10) provided with the accommodating hole (14); and when the second gripper (30b) drives the open end of the net bag (20b) to move from the first position to the second position, the open end of the net bag (20b) goes back to the shuttle (10).

3. The packaging equipment for continuous automatic net sleeving of the casing according to claim 1, wherein an inner side of the second gripper (30b) is provided with fine teeth (32) to bite the net bag (20b), the second gripper (30b) exactly presses the net bag (20b) sleeving the shuttle (10) but does not clamp the shuttle (10) when being closed, so as to drive the open end of the net bag (20b) to make reciprocating motion between the first position and the second position on the shuttle (10).

4. The packaging equipment for continuous automatic net sleeving of the casing according to claim 1, further comprising a discharging sliding sleeve (80), wherein the discharging sliding sleeve (80) sleeves the casing conveying rod (40), is located between the shined casing (70) and a rod handle of the casing conveying rod (40) and is configured to demount the shined casing (70) from the casing conveying rod (40).

5. The packaging equipment for continuous automatic net sleeving of the casing according to claim 1, wherein the accommodating hole (14) is designed to be in sliding fit with the casing conveying rod (40) in size, and is configured to ensure that when the casing conveying rod (40) is inserted into the accommodating hole (14), the shuttle (10) does not shake.

6. The packaging equipment for continuous automatic net sleeving of the casing according to claim 1, wherein the packaging equipment for continuous automatic net sleeving of the casing is provided with a plurality of casing conveying rods (40) capable of being switched in position.

7. The packaging equipment for continuous automatic net sleeving of the casing according to claim 1, wherein a short sleeve tube (34) is located at a center of the third gripper (30*c*), an inner hole of the short sleeve tube (34) is slightly greater than an outer diameter of the shirred casing (70), and the open end of the net bag (20*b*) is opened to sleeve an outer wall of the short sleeve tube (34) of the third gripper (30*c*).

8. The packaging equipment for continuous automatic net sleeving of the casing according to claim 1, wherein the third gripper (30*c*) is designed to be capable of making reciprocating motion between the discharging sliding sleeve (80) and the end of the shuttle (10) provided with the accommodating hole (14) in an axial direction of the casing conveying rod (40).

9. A shining machine, comprising the packaging equipment for continuous automatic net sleeving of the casing according to claim 1.

10. A casing packaging method, wherein the casing packaging method uses the packaging equipment for continuous automatic net sleeving of the casing according to claim 1, and the casing packaging method comprises the following steps:

closing a first gripper (30*a*) to clamp and fix one end of a shuttle (10) sleeved with a net bag (20*b*) and moving a third gripper (30*c*) towards the shuttle (10) in an axial direction of a casing conveying rod (40) so as to closely abut against the other end of the shuttle (10);

closing a second gripper (30*b*) to drive an open end of the net bag (20*b*) to move from a second position to a first position so as to enable the open end of the net bag (20*b*) to extend out of an end of the shuttle (10), opening the open end of the net bag (20*b*) to sleeve an outer wall of a short sleeve tube (34) of the third gripper (30*c*) and then opening the second gripper (30*b*);

moving the casing conveying rod (40) sleeved with a shirred casing (70) towards the shuttle (10) to penetrate through the third gripper (30*c*) so as to be inserted into an accommodating hole (14) of the shuttle (10), and opening the first gripper (30*a*) at the moment;

closing the third gripper (30*c*) to clamp the open end of the net bag (20*b*), closing a fourth gripper (30*d*) to clamp the net bag (20*b*), moving the third gripper (30*c*) and the fourth gripper (30*d*) synchronously to a rod handle direction of the casing conveying rod (40) by a length required for packaging the shined casing by the net bag, and sleeving the shined casing (70) with the net bag (20*b*) in a penetrating mode;

closing the first gripper (30*a*) to fix the shuttle (10), and moving the casing conveying rod (40) in a direction away from the shuttle (10) till the casing conveying rod (40) is pulled out of the accommodating hole (14) of the shuttle (10);

forming a sufficient gap between the casing conveying rod (40) and the shuttle (10) to allow a net bag cutting device (50) to extend out to cut off the net bag (20*b*) and then reset;

opening the fourth gripper (30*d*), continuing to move the third gripper (30*c*) in the direction away from the shuttle (10) till the short sleeve tube (34) clamping the net bag (20*b*) sleeves a section of a discharging sliding sleeve (80) close to the shined casing in a penetrating mode;

closing the second gripper (30*b*) to drive the open end of the net bag (20*b*) to move from the first position to the second position;

closing a packaged casing accommodating bin clamp (30*e*) to clamp and fix the shined casing (70) packaged with the net bag (20*b*), wherein a length of the net bag sleeving the shined casing (70) in the penetrating mode is greater than a length of the shined casing (70), and extending a net bag with a certain length for tying out of two ends of the packaged casing accommodating bin clamp (30*e*);

continuing to move the casing conveying rod (40) axially in the direction away from the shuttle, fixing the discharging sliding sleeve (80) with a discharging clamp (30*f*) at the moment and demounting the shined casing (70) from the casing conveying rod (40);

moving the packaged casing accommodating bin clamp (30*e*) carrying the shined casing packaged with the net bag (20*b*) to a tying position; tying two ends of the net bag (20*b*) exposed at two ends of the packaged casing accommodating bin clamp (30*e*) by net bag tying devices (60); opening the packaged casing accommodating bin clamp (30*e*), and placing the shirred casing (70) packaged with the net bag on a finished-product tray.

11. The casing packaging method according to claim 10, further comprising the following steps:

switching another casing conveying rod (40) sleeved with a shirred casing to a position of the current casing conveying rod (40) after enabling the casing conveying rod (40) to move in the direction away from the shuttle (10) till the shirred casing (70) is demounted;

then moving the casing conveying rod (40) at the current position towards the shuttle (10), and repeating all the subsequent steps till the shined casing (70) packaged with the net bag (20*b*) falls down to leave the packaging equipment for continuous automatic net sleeving of the casing.

12. The casing packaging method according to claim 10, further comprising the following step:

when the packaging equipment for continuous automatic net sleeving of the casing is used for the first time after newly purchased or the packaging equipment for continuous automatic net sleeving of the casing is used for the first time after a net bag roll (20*a*) is used up, pulling the net bag (20*b*) out from the net bag roll (20*a*) to sequentially penetrate through the fourth gripper (30*d*), the first gripper (30*a*) and the second gripper (30*b*) so as to enable the net bag (20*b*) to sleeve the shuttle (10) in a penetrating mode to sleeve the short sleeve tube (34) of the third gripper (30*c*).

\* \* \* \* \*